Jan. 12, 1971  G. M. GOLDBERG  3,554,795
ULTRA-THIN FILM SOLID ELECTROLYTE ELECTROCHEMICAL
DEVICES AND FABRICATION METHODS THEREFOR
Filed Aug. 30, 1968
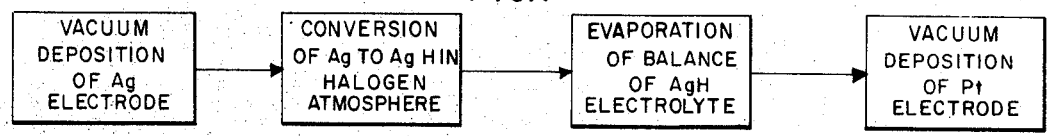
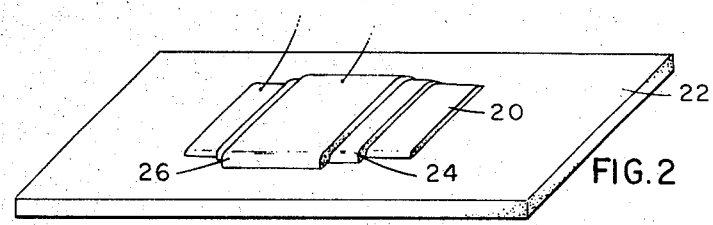
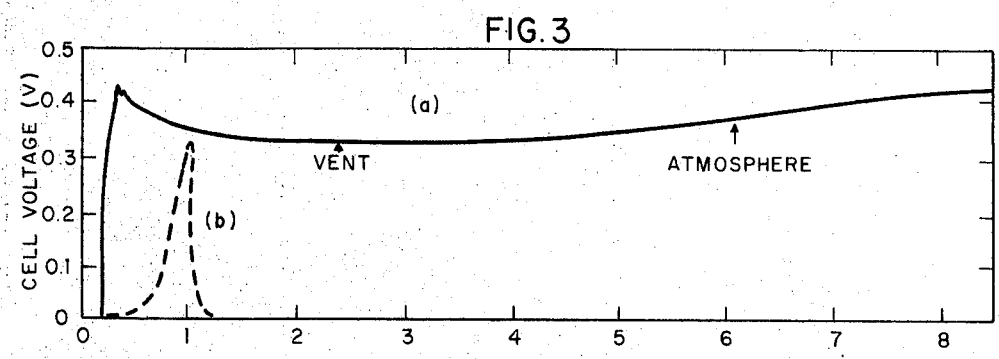
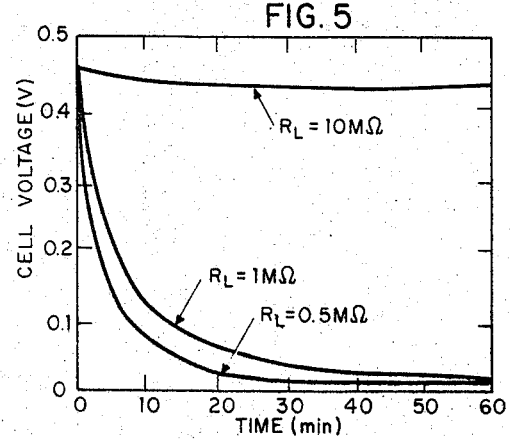
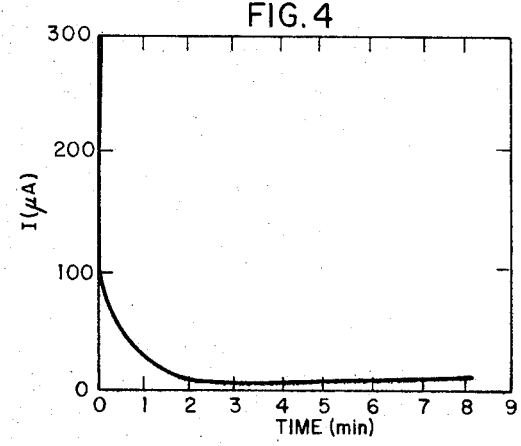
GERSHON M. GOLDBERG
INVENTOR
BY: ALFRED H. ROSEN
and
JOHN H. COULT
ATTORNEYS 3,554,795
Patented Jan. 12, 1971

3,554,795
ULTRA-THIN FILM SOLID ELECTROLYTE ELECTROCHEMICAL DEVICES AND FABRICATION METHODS THEREFOR
Gershon M. Goldberg, Arlington, Mass., assignor to Technical Operations, Incorporated, Burlington, Mass., a corporation of Delaware
Filed Aug. 30, 1968, Ser. No. 756,584
Int. Cl. B44d 1/18
U.S. Cl. 117—217               9 Claims

ABSTRACT OF THE DISCLOSURE

This disclosure depicts ultra-thin film solid eletcrolyte devices for use as batteries, sensors, and the like, comprising electrodes and solid electrolytes all formed by vacuum deposition. Novel fabrication methods are shown for depositing a silver halide electrolyte in a very thin layer without the occurrence of voids in the electrolyte by first depositing a layer of silver which is converted to silver halide in halogen gas atmosphere and then completing the electrolyte by silver halide vapor deposition techniques.

BACKGROUND OF THE INVENTION

The solid-state electrochemical devices to which this invention relates are susceptible of many and diverse applications. A printed battery represents perhaps the most promising application. Solid-state batteries, unlike conventional batteries that employ the well-known but troublesome liquid electrolytes, for the most part offer many advantages over liquid electrolyte devices. They are, in general, corrosion-proof, susceptible to mainiaturization, and having long shelf lives. The salient drawback of solid electrolyte batteries to date has been their relatively high internal resistance. Mrgudich describes batteries with a pelletized silver iodide electrolyte having internal resistances in the order of 50 KΩ to 3 MΩ/cm.² (see the December 1965 issue (vol. AES–1, No. 3) of the IEEE Transactions on Aerospace and Electronics Systems; also, other pertinent articles: Science Conference Proceedings, Office, Chief of Research and Development, Dept. of the Army, Washington, D.C.; Preliminary Report on a Rechargeable, Solid-Eelectrolyte Battery, Proc. of 19th Annual Power Sources Conference, pp. 86–88.) This range is many orders of magnitude higher than found in liquid electrolyte batteries of equivalent performance. This property has had a depressing effect upon the development of solid electrolyte devices. An exhaustive review of work done on solid-state electrochemical devices has been compiled by A. B. Lidiard in Handbuch der Physik (Berlin: Springer-Verlag, 1957) vol. 20. p. 250. The above-cited Mrgudich and Lidiard articles and the references cited in these works are incorporated by reference herein as background material.

The high internal resistance of solid-state electrochemical devices is attributable to : (v) the poor ionic conductivity of the electrolyte material, and (2) the boundary resistance generated at one or both of the electrode-electrolyte interfaces. Attempts to reduce the ionic resistance of devices having a silver halide electrolyte, a very widely investigated class of solid electrolyte materials, by employing a very thin electrolyte layer have been thwarted by the extreme difficulty of depositing an ultra-thin continuous layer of silver halide material without producing voids in the layer which are apt to cause short circuiting through the layer.

OBJECTS OF THE INVENTION

It is an object of this invention to provide ultra-thin film solid electrolyte electrochemical devices which have lower D.C. internal resistance than previously attainable, and methods for fabricating such devices to achieve such minimization of internal resistance. It is a specific object to surmount the problem of void development in ultra-thin silver halide layers.

Further objects and advantages of the invention will in part be obvious and will in part become apparent as the following description proceeds.

The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawing wherein:

FIG. 1 diagrammatically illustrates a method of fabricating ultra-thin film solid electrolyte electrochemical devices in accordance with this invention;

FIG. 2 schematically illustrates an ultra-thin film electrochemical device which may be fabricated in accordance with the method of FIG. 1;

FIG. 3 characterizes the variation of open circuit voltage (OCV) with time during deposition of the silver electrode of both sound and shorted thin film cells; and FIGS. 4 and 5 represent typical charge and discharge curves for an ultra-thin film Pt/AgI/Ag cell constructed according to this invention.

DESCRIPTION OF THE PREFERRED EMBODIMENTS

Consider the electrochemistry of a platinum/silver iodide/silver concentration cell in terms of aqueous potential theory. At the Ag/AgI interface there is a spontaneous potental given by the couple $$\text{Ag}^{\circ}{}_{(a_1)} = \text{Ag}^{+} + e^{-} \tag{1}$$

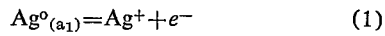

where $a_1$ is the activity of free silver at the silver electrode. The platinum electrode acts as an inert electrode from which the interstitial $\text{Ag}^+$ on may attract an electron to form deposited $\text{Ag}^\circ$, thus establishing the equilibrium $$\text{Ag}^{+} + e^{-} = \text{Ag}^{\circ}{}_{(a_2)} \tag{2}$$

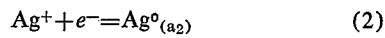

where $a_2$ is the activity of free silver at the platinum electrode.

When the outer circuit is closed, the net cell reaction will be given by the sum of Eqs. 1 and 2 corresponding to $$\text{Ag}^{\circ}{}_{(a_1)} = \text{Ag}^{\circ}{}_{(a_2)} \tag{3}$$

The potential (E) of the cell will be given by $$E = \frac{RT}{nF} \ln \frac{a_1}{a_2} \tag{4}$$

where F is the Faraday constant, T the absolute temperature, and R the gas constant in electron volts. Since the activity of free silver in silver is constant, the cell EMF becomes inversely proportional to the silver activity at the platinum electrode. The cell will cease to function as a battery when the platinum electrode becomes saturated with free silver $(a_2=a_1)$, in which case we have the symmetrical Ag/AgI/Ag system. The Pt/AgI/Ag cell is a concentration cell and can be recharged by applying a positive potential to the platinum electrode and driving the deposited free silver back into "solution" as $\text{Ag}^+$ ions, and thus replenishing the silver lost from the silver electrode during the discharge cycle. The charging voltage should not exceed approximately 0.685 v., which is the decomposition potential of AgI into $\text{I}_2$ and $\text{Ag}^\circ$.

As indicated above, devices with ultra-thin electrolytes offer minimized ionic resistance, but are inseparably associated with the short circuiting problem. An investigation into the nature of the formation of vacuum deposited silver halide films reveals that voids are formed in the microstructure of deposited silver halide films, void formation being much more severe with evaporated silver iodide films than with silver bromide films. In accordance with this invention, I have devised a method of overcoming the void formation problem in thin films of silver halide, especially silver iodide.

The preferred procedure for fabricating a void-free cell (for example, a Pt/AgH/Ag cell) is generally as follows (see FIG. 1).

First evaporate by conventional techniques a layer of silver, representing the silver electrode, upon a suitable substrate (quartz, for example). The silver layer may vary widely in thickness, however, we have found a thickness in the order of $1\mu$ to be satisfactory. The silver layer is then placed in an iodine chamber for approximately 24 hours to ensure the conversion of most of the silver to silver halide. A second layer of silver-iodide is then deposited by evaporation over the original ultra-thin silver halide film which acts as a wetting layer offering nucleii for the formation of uniform and void-free deposits of silver halide. The film of silver iodide may be deposited from a tungsten boat at a pressure of $3 \times 10^{-5}$–$5 \times 10^{-5}$ mm. Hg. The boat temperature is kept constant during the evaporation in the range 550°–680°, preferably at 560° for AgI. The total thickness of the electrolyte is preferably in the range 4–$12\mu$.

Finally, the platinum electrode 20 is deposited on the electrolyte 22 by sputtering, care being taken to mask off the silver electrode to prevent short circuiting of the cell. A CVC AST-100 low energy sputtering unit may be employed with deposition pressure preferably at $2 \times 10^{-3}$ mm. Hg. The target voltage is preferably about 600 v. with the receiving surface placed approximately 6 inches from the target.

Alternatively, the cell may be formed by first sputtering a platinum electrode on a substrate to a thickness of 500–1000 A. An ultra-thin film of silver, for example in the order of 1000 A. thick is evaporated upon the platinum electrode. Assuming, for example, that a silver iodide electrolyte is desired, the laminate is placed in an iodine atmosphere until the silver film is substantially completely converted to silver iodide. As in the first-described method, silver iodide is then evaporated upon the iodided silver film, followed by deposition of the second electrode, in this case the silver electrode. Although each of the above methods yields operable cells, the first-described method is perhaps preferred, for the reasons: (1) one less step is required in the fabrication process, and (2) there exists the possibility that when the ultra-thin silver film is deposited upon the platinum electrode, an alloy may be formed which would have a saturating effect on the platinum electrode and may cause a lack of uniformity in electrical characteristics from cell-to-cell.

Electrical contact may be established with the thin-film electrodes by cementing fine electrical wires to the electrodes with conductive Eccobond Solder No. 56-C.

As suggested, the above techniques are adaptable for the formation of electrolytes of silver iodide, silver bromide and other materials; however, in spite of the greater susceptibility of silver iodide to the formation of voids, this material is preferred over other potential electrolytes, having relatively low resistance to the conduction of ions, and exhibiting relatively great reluctance to release its halogen component as a result of photolytic and/or electrolytic action.

It has been found that recording of the open circuit voltage (OCV) of a cell during its formation in a vacuum makes it possible to study the electrical properties of thin-film cells as a function of time during deposition. FIG. 2 shows typical open circuit voltage (OCV) vs. time curves during deposition of the silver electrode for both sound and shorted cells.

FIG. 3 shows a typical transient charging curve for a cell formed as just described. FIG. 4 shows a series of discharge curves for the same cell for loads of .5 M$\Omega$, 1 M$\Omega$, and 10 M$\Omega$.

The invention is not limited to the particular details of construction of the embodiments and methods depicted, and it is contemplated that various and other modifications and applications will occur to those skilled in the art. Single cell units have been described; however, the methods taught by this invention may be readily used by those skilled in the art to fabricate stacked arrays of cell units.

Since certain changes may be made in the above-described articles and methods without departing from the true spirit and scope of the invention herein involved, it is intended that the subject matter of the above depiction shall be interpreted as illustrative and not in a limiting sense.

What is claimed is:

1. A method of making ultra-thin film solid electrolyte electrochemical devices, comprising:
   vacuum depositing upon a base a thin layer of silver to act as a first electrode;
   exposing said silver layer to halogen vapor until a surface film of silver halide is formed upon said silver layer;
   evaporating a layer of the same silver halide material upon said converted silver layer; and
   vacuum depositing upon the laminate formed a second electrode comprising a thin layer of an electron-conductive material.

2. A method of making ultra-thin film solid electrolyte electrochemical devices, comprising:
   vacuum depositing upon a base a first electrode comprising a thin layer of an electron-conductive material;
   depositing upon said first electrode an ultra-thin layer of silver;
   exposing the laminate formed to a halogen vapor until the silver in said silver layer is substantially completely converted into silver halide;
   evaporating a layer of the same silver halide material upon said converted silver layer; and
   vacuum depositing upon the laminate formed a second electrode comprising a thin layer of an electron-conductive material.

3. The method defined by claim 2 wherein said silver layer is deposited to a thickness of about 1000 A.

4. The method defined by claim 3 wherein said silver layer and evaporated silver halide are deposited to a cumulative thickness of about 4–$12\mu$.

5. The method defined by claim 4 wherein said first electrode is composed of platinum.

6. The method defined by claim 5 wherein said second electrode is composed of silver.

7. The method defined by claim 6 wherein said silver halide consists of silver iodide.

8. The method defined by claim 4 wherein each of said first and second electrodes are composed of the same material.

9. The method defined by claim 8 wherein said common electrode material is silver.

References Cited

UNITED STATES PATENTS

| | | | |
|---|---|---|---|
| 1,758,293 | 5/1930 | Murray | 148—6.3X |
| 2,491,837 | 12/1949 | Smith-Johannsen | 148—6.3X |
| 3,455,742 | 7/1969 | Rao | 136—153X |

RALPH S. KENDALL, Primary Examiner

U.S. Cl. X.R.

117—107; 136—6, 83, 153, 175; 148—6.3

PO-1050
(5/69)

UNITED STATES PATENT OFFICE
CERTIFICATE OF CORRECTION

Patent No. 3,554,795     Dated January 12, 1971

Inventor(s)  GERSHON M. GOLDBERG

It is certified that error appears in the above-identified patent and that said Letters Patent are hereby corrected as shown below:

Col. 3, line 72, "FIG. 2" should be --FIG. 3--;
Col. 4, line 1, "FIG. 3" should be --FIG. 4--; and
Col. 4, line 2, "FIG. 4" should be --FIG. 5--.

Signed and sealed this 8th day of August 1972.

(SEAL)
Attest:

EDWARD M. FLETCHER, JR.            ROBERT GOTTSCHALK
Attesting Officer                  Commissioner of Patents